(12) United States Patent
Qi

(10) Patent No.: US 9,237,476 B2
(45) Date of Patent: *Jan. 12, 2016

(54) METHODS AND APPARATUS FOR PROVIDING INFORMATION INDICATIVE OF TRAFFIC DELAY OF A WIRELESS LINK

(71) Applicant: Intel Corporation, Santa Clara, CA (US)

(72) Inventor: Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,868

(22) Filed: Jul. 15, 2013

(65) Prior Publication Data

US 2014/0160960 A1 Jun. 12, 2014

Related U.S. Application Data

(63) Continuation of application No. 12/971,424, filed on Dec. 17, 2010, now Pat. No. 8,488,563, and a continuation of application No. 11/781,655, filed on Jul. 23, 2007, now Pat. No. 8,040,853, and a continuation of application No. 11/139,156, filed on May 26, 2005, now Pat. No. 7,269,406.

(51) Int. Cl.
*H04W 24/10* (2009.01)
*H04L 12/26* (2006.01)
*H04W 24/00* (2009.01)

(52) U.S. Cl.
CPC ........... *H04W 24/10* (2013.01); *H04L 43/0852* (2013.01); *H04W 24/00* (2013.01)

(58) Field of Classification Search
CPC ... H04W 24/10; H04W 24/00; H04L 43/0852
USPC .......................................... 370/328, 332, 333
See application file for complete search history.

(56) References Cited

U.S. PATENT DOCUMENTS

| | | |
|---|---|---|
| 5,220,581 A | 6/1993 | Ferraiolo et al. |
| 6,751,573 B1 | 6/2004 | Burch |
| 7,113,782 B2 | 9/2006 | Lucidarme |
| 7,269,406 B2 | 9/2007 | Qi |
| 7,394,797 B2 | 7/2008 | Kowalski |
| 8,488,563 B2 * | 7/2013 | Qi ................................. 370/332 |
| 2003/0022627 A1 | 1/2003 | Fernandez-Corbaton et al. |
| 2003/0128692 A1 | 7/2003 | Mitsumori et al. |
| 2004/0024801 A1 | 2/2004 | Hamilton et al. |

(Continued)

FOREIGN PATENT DOCUMENTS

| | | |
|---|---|---|
| WO | 2006/128137 A2 | 11/2006 |
| WO | 2006/128137 A3 | 1/2007 |

OTHER PUBLICATIONS

Office Action received for United Kingdom Patent Application No. 0724613.5, mailed on Jan. 30 2009, 3 pages.

(Continued)

*Primary Examiner* — Mohammad Anwar
(74) *Attorney, Agent, or Firm* — Sutherland Asbill & Brennan LLP

(57) ABSTRACT

Embodiments of methods and apparatus for providing information indicative of traffic delay of a wireless link are generally described herein. Other embodiments may be described and claimed.

20 Claims, 5 Drawing Sheets

(56) References Cited

U.S. PATENT DOCUMENTS

| | | |
|---|---|---|
| 2004/0062207 A1 | 4/2004 | Gross |
| 2004/0071095 A1 | 4/2004 | Raisanen |
| 2005/0083849 A1 | 4/2005 | Rui et al. |
| 2005/0152280 A1 | 7/2005 | Pollin et al. |
| 2006/0182039 A1 | 8/2006 | Jourdain et al. |
| 2007/0002890 A1 | 1/2007 | Mangold et al. |

OTHER PUBLICATIONS

Notice of Allowance received for U.S Appl. No. 11/139,156, mailed on Jun. 26, 2007, 8 pages.
Office Action received in U.S. Appl. No. 11/139,156, mailed on Oct. 26, 2006, 9 pages.
Office Action received in U.S. Appl. No. 11/139,156, mailed on Mar. 26, 2007, 14 pages.
Office Action received in U.S. Appl. No. 11/781,655, mailed on Sep. 14, 2010, 25 pages.
Office Action received in U.S. Appl. No. 11/781,655, mailed on Mar. 7, 2011, 12 pages.
Notice of Allowance received for U.S. Appl. No. 12/971,424, mailed on Mar. 15, 2013, 9 pages.
Office Action received for U.S. Appl. No. 12/971,424, mailed on Nov. 14, 2013, 13 pages.
Office Action received for Chinese Patent Application No. 200680018294.4, mailed on Jan. 6, 2011, 2 pages of English Translation and 3 pages of Chinese Office Action.
Office Action received for Chinese Patent Application No. 200680018294.4, mailed on Mar. 30, 2012, 4 pages of English Translation and 3 pages of Chinese Office Action.
Office Action received for Chinese Patent Application No. 200680018294.4, mailed on Dec. 2, 2011, 5 pages of English Translation and 5 pages of Chinese Office Action.
Office Action received for Chinese Patent Application No. 200680018294.4, mailed on Nov. 12, 2012, 4 pages of English Translation and 3 pages of Chinese Office Action.
Office Action received for Chinese Patent Application No. 200680018294.4, mailed on Feb. 22, 2013, 6 pages of English Translation and 4 pages of Chinese Office Action.
Office Action received for Chinese Patent Application No. 200680018294.4, mailed on Jun. 5, 2009, 16 pages of English Translation and 9 pages of Chinese Office Action.
Feigin et al., "Measurement of Characteristics of Voice Over IP in a Wireles Lan Environment", Mobile Multimedia Communications (MoMuC '99), 1999 IEEE International Workshop, CA, USA, Nov. 15-17, 1999, pp. 236-240.
International Preliminary Report on Patentability and Written Opinion received for PCT Patent Application No. PCT/US06/020833, mailed on Dec. 13, 2007, 8 pages.
International Search Report and Written opinion received for PCT Patent Application No. PCT/US06/020833, mailed on Oct. 27, 2006, 12 pages.

\* cited by examiner

| Bin | Delay Interval | Count |
|---|---|---|
| 0 | Delay < 10 ms | 0 |
| 1 | 10 ms ≤ Delay < 20 ms | 2 |
| 2 | 20 ms ≤ Delay < 40 ms | 5 |
| 3 | 40 ms ≤ Delay < 80 ms | 1 |
| 4 | 80 ms ≤ Delay < 160 ms | 1 |
| 5 | 160 ms ≤ Delay < 320 ms | 1 |
| 6 | 320 ms ≤ Delay < 640 ms | 0 |
| 7 | 640 ms ≤ Delay | 0 |

METHODS AND APPARATUS FOR PROVIDING INFORMATION INDICATIVE OF TRAFFIC DELAY OF A WIRELESS LINK

CROSS-REFERENCE TO RELATED APPLICATIONS

This application is a continuation of application of U.S. patent application Ser. No. 12/971,424, filed on Dec. 17, 2010, which is a continuation application of U.S. patent application Ser. No. 11/781,655, filed on Jul. 23, 2007, (now U.S. Pat. No. 8,040,853) which is a continuation of U.S. patent application Ser. No. 11/139,156, filed on May 26, 2005 (now U.S. Pat. No. 7,269,406). These applications are incorporated herein by reference in their entirety.

TECHNICAL FIELD

The present disclosure relates generally to wireless communication systems, and more particularly, to methods and apparatus for providing information indicative of traffic delay of a wireless link.

BACKGROUND

As wireless communication becomes more and more popular at offices, homes, schools, etc., the demand for resources may cause network congestions and slowdowns in wireless environments. In particular, latency and/or jitter of wireless links may reduce performance and/or network capacity. For example, real-time multimedia traffic requiring timely delivery such as voice and/or video transmissions and other types of traffic such as data transmissions may contend for limited resources of wireless environments. To reduce performance degradations and/or overload conditions, metrics of the wireless links (e.g., delay) may be measured.

DETAILED DESCRIPTION

In general, methods and apparatus for providing information indicative of traffic delay of a wireless link are described herein. The methods and apparatus described herein are not limited in this regard.

Figure 1:
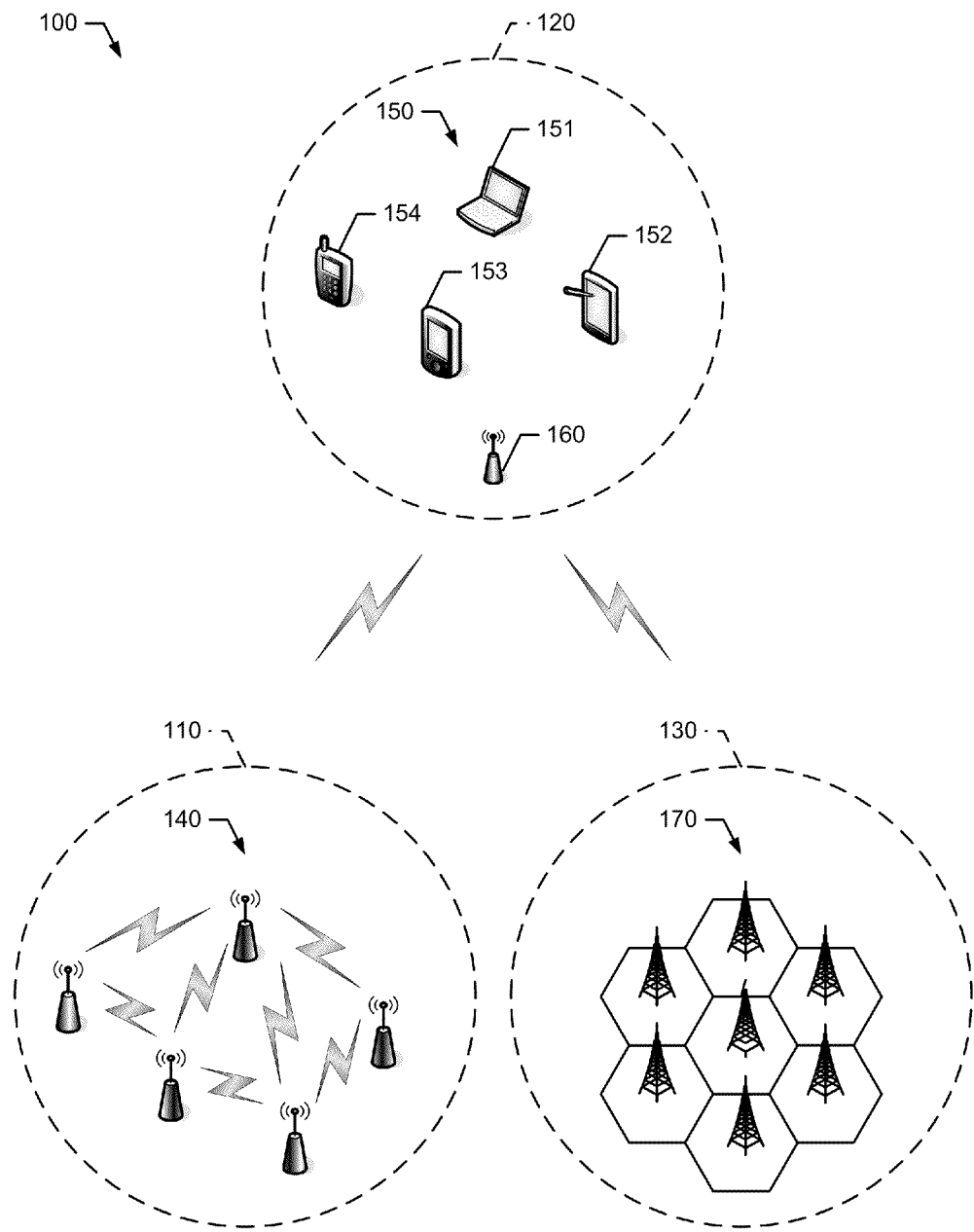
FIG. 1 is a schematic diagram representation of an example wireless communication system according to an embodiment of the methods and apparatus disclosed herein.

Referring to FIG. 1, an example wireless communication system 100 including one or more wireless communication networks, generally shown as 110, 120, and 130, is described herein. Although FIG. 1 depicts three wireless communication networks, the wireless communication system 100 may include additional or fewer wireless communication networks. Each of the wireless communication networks 110, 120, and 130 may include one or more communication nodes. In one example, the wireless communication network 110 may be a wireless mesh network. The wireless mesh network 110 may include two or more mesh points (MPs) 140. Although FIG. 1 depicts five MPs, the wireless mesh network 110 may include additional or fewer MPs. The MPs 140 may include access points, redistribution points, end points, and/or other suitable connection points for traffic flows via mesh paths.

The MPs 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other. For example, the MPs 140 may implement OFDM modulation to transmit large amounts of digital data by splitting a radio frequency signal into multiple small sub-signals, which in turn, are transmitted simultaneously at different frequencies. In particular, the MPs 140 may use OFDM modulation as described in the 802.xx family of standards developed by the Institute of Electrical and Electronic Engineers (IEEE) and/or variations and evolutions of these standards (e.g., 802.11, 802.15, 802.16, etc.) to communicate via the wireless links with each other (e.g., forward data within the wireless mesh network 110). The MPs 140 may also operate in accordance with other suitable wireless communication protocols that require very low power such as Bluetooth, Ultra Wideband (UWB), and/or radio frequency identification (RFID) to communicate with each other via wireless links. The methods and apparatus described herein are not limited in this regard.

The wireless communication system 100 may also include wireless non-mesh networks. In one example, the wireless communication network 120 may be a basic service set (BSS) network. The BSS network 120 may include one or more stations 150, generally shown as 151, 152, 153, and 154. Although FIG. 1 depicts four stations, the BSS 120 may include additional or fewer stations. For example, the BSS 120 may include a laptop computer, a desktop computer, a handheld computer, a tablet computer, a cellular telephone, a pager, an audio/video device (e.g., an MP3 player), a game device, a navigation device (e.g., a GPS device), a monitor, a printer, a server, and/or other suitable wireless electronic devices.

The stations 150 may communicate via wireless links as described in the 802.xx family of standards developed by the Institute of Electrical and Electronic Engineers (IEEE) and/or variations and evolutions of these standards (e.g., 802.11, 802.15, 802.16, etc.). In one example, the stations 150 may operate in accordance with the 802.16 family of standards developed by IEEE to provide for fixed, portable, and/or mobile broadband wireless access (BWA) networks (e.g., the IEEE std. 802.16, published 2004). The stations 150 may also use direct sequence spread spectrum (DSSS) modulation (e.g., the IEEE std. 802.11b) and/or frequency hopping spread spectrum (FHSS) modulation (e.g., the IEEE std. 802.11).

Further, the stations 150 may also operate in accordance with other suitable wireless communication protocols that require very low power such as Bluetooth, UWB, and/or RFID to communicate via wireless links. Alternatively, the stations 150 may communicate via wired links (not shown). For example, the stations 150 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate. The methods and apparatus described herein are not limited in this regard.

The BSS network 120 may also include one or more communication nodes such as an access point (AP) 160 to provide wireless communication services to the stations 150. Although FIG. 1 depicts one AP, the BSS 120 may include additional APs. The AP 160 may receive and/or transmit data in connection with the stations 151, 152, 153, and/or 154. In addition to operating as an access point within the BSS network 120, the AP 160 may operate as a mesh AP (e.g., mesh AP 270 of FIG. 2). For example, the AP 160 may operate as an MP of the wireless mesh network 110 to communicate with the MPs 140. In particular, the AP 160 may receive and/or transmit data in connection with one or more of the plurality of MPs 140. As a result, the AP 160 may operate as a mesh AP to communicate with both the MPs 140 of wireless mesh network 110 and the stations 150 of the BSS network 120.

The wireless communication system 100 may also include a radio access network (RAN) 130 (e.g., a cellular network). The RAN 130 may include one or more base stations 170. Although FIG. 1 depicts seven base stations, the RAN 130 may include additional or fewer base stations. The base stations 170 may operate in accordance with one or more of several wireless communication protocols to communicate with wireless communication devices and/or nodes of the wireless mesh network 110, the BSS network 120, and/or other wireless communication networks.

In one example, the base stations 170 of the RAN 130 may communicate with the stations 150 of the BSS network 120 directly (e.g., without using the AP 160). In particular, these wireless communication protocols may be based on analog, digital, and/or dual-mode communication system standards such as frequency division multiple access (FDMA)-based standards, the time division multiple access (TDMA)-based standards (e.g., Global System for Mobile Communications (GSM), General Packet Radio Services (GPRS), Enhanced Data GSM Environment (EDGE), Universal Mobile Telecommunications System (UMTS), etc.), code division multiple access (CDMA)-based standards, wideband CDMA (WCDMA)-based standards, variations and evolutions of these standards, and/or other suitable wireless communication standards. The methods and apparatus described herein are not limited in this regard.

Further, the wireless communication system 100 may include other wireless personal area network (WPAN) devices, wireless local area network (WLAN) devices, wireless metropolitan area network (WMAN) devices, and/or wireless wide area network (WWAN) devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless mesh network 110 may be implemented to provide WPANs, WLANs, WMANs, WWANs, and/or other suitable wireless communication networks. Although certain examples have been described above, the scope of coverage of this disclosure is not limited thereto.

Figure 2:
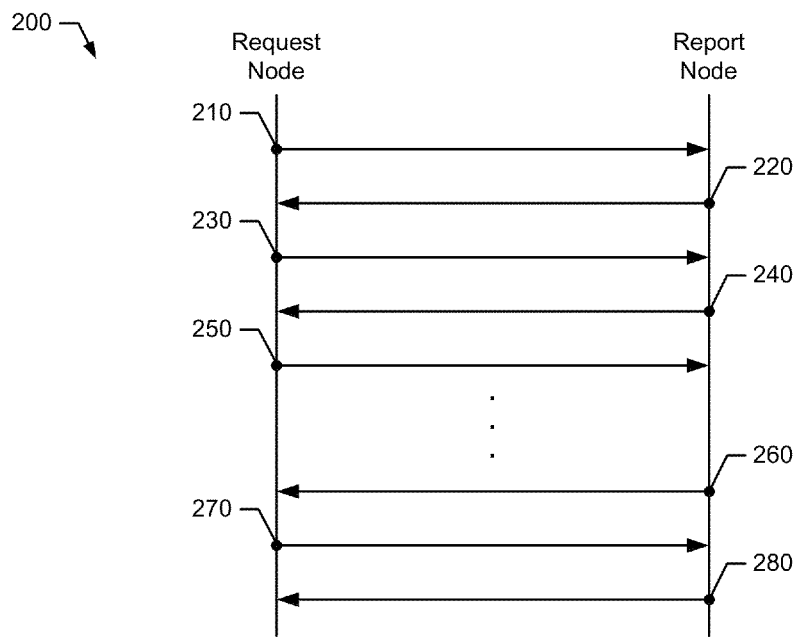
FIG. 2 is a sequence diagram representation of an example delay measurement system.
Figure 3:
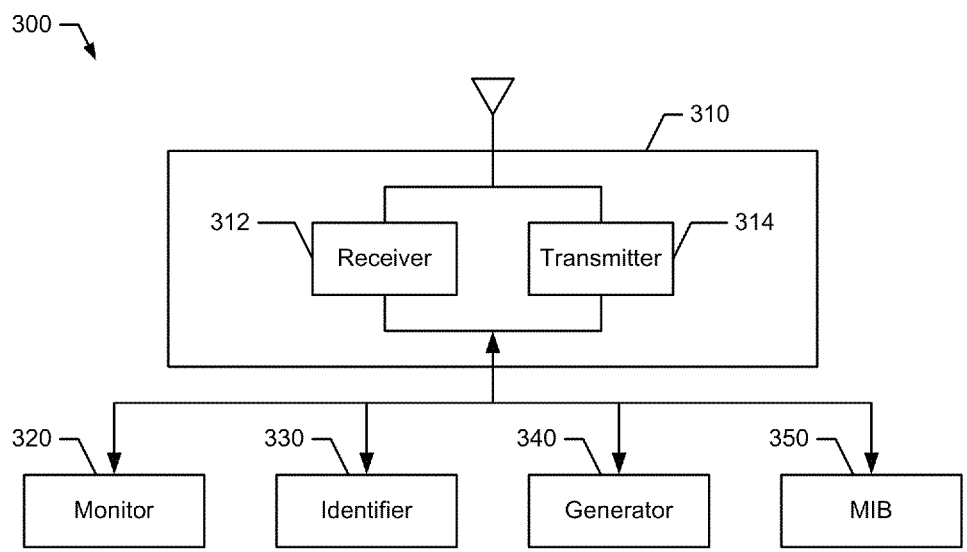
FIG. 3 is a block diagram representation of an example communication node of FIG. 2.

In the example of FIG. 2, a delay measurement system 200 may include a request node and a report node (e.g., the communication node 300 of FIG. 3 may be configured to operate as either the request node or the report node). In general, the request node may be configured to transmit a measurement request to the report node, which in turn, may transmit a measurement report to the request node. The request node may transmit the measurement request (e.g., the measurement request 400 of FIG. 4) to the report node (210). For example, the request node may format the measurement request based on the proposed IEEE std. 802.11k and/or variations and evolutions of this proposed standard. The methods and apparatus described herein are not limited in this regard.

In response to receiving the measurement request from the request node, the report node may transmit one or more frames, generally shown as 220, 240, and 260, to the request node for a measurement duration specified by the measurement request. The request node may transmit an acknowledgement, generally shown as 230, 250, and 270, to the report node for each frame received by the request node. In one example, the request node may transmit the acknowledgement 230 in response to receipt of the frame 220. In another example, the request node may transmit the acknowledgement 250 in response to receipt of the frame 240. Likewise, the request node may transmit the acknowledgement 270 in response to receipt of the frame 260. Although FIG. 2 depicts three communication pairs (e.g., a frame and an acknowledgement), the delay measurement system 200 may include additional or fewer communication pairs based on the measurement duration.

Accordingly, the report node may generate histogram information based on the acknowledgements 230, 250, and 270 from the request node. The report node may generate histogram information indicative of traffic delay of the wireless link between the request and report nodes (e.g., the table 600 of FIG. 6). For example, the histogram information may include information associated with a maximum delay, a minimum delay, a mode delay, an average delay, or jitter associated with the wireless link. Based on the histogram information, the report node may transmit a measurement report (e.g., the measurement report 500 of FIG. 5) to the request node (280). The methods and apparatus described herein are not limited in this regard.

Referring to FIG. 3, an example communication node 300 may include a communication interface 310, a monitor 320, an identifier 330, a generator 340, and a management information base (MIB) 350. As noted above, the communication node 300 may be configured to operate as either a request node or a report node. For example, the communication node 300 may be a station or an access point of a BSS, or a mesh point of a mesh network. The methods and apparatus described herein are not limited in this regard.

The communication interface 310 may include a receiver 312 and a transmitter 314. The communication interface 310 may receive and/or transmit traffic associated with wireless communication networks including mesh networks (e.g., the wireless mesh network 110 of FIG. 1) and/or non-mesh networks (e.g., the BSS network 120 and/or the RAN 130 of FIG. 1). In particular, the receiver 312 may receive transmissions from other communication node(s) such as a station, an access point, and/or a mesh point. For example, if the communication node 300 is operating as the request node, the receiver 312 may receive a measurement request. The transmitter 314 may send transmissions to other communication node(s). For example, if the communication node 300 is operating as the report node, the transmitter 314 may transmit a measurement report.

The monitor 320, the identifier 330, the generator 340, and the MIB 350 may be operatively coupled to the communication interface 310. Briefly, the monitor 320 may be configured to monitor duration of traffic via a wireless link between the communication node 300 and another communication node. The identifier 330 may be configured to identify a plurality of bins with each bin corresponding to a delay interval of a measurement duration. The generator 340 may be configured to generate histogram information indicative of delay associated with the wireless link. For example, the generator 340 may include one or more counters (not shown) with each counter corresponding to one of the plurality of bins. In one example, the counters may count a number of frames. In another example, the counters may count a number of packets. The MIB 350 may be configured to store the counters of the generator 340.

While the components shown in FIG. 3 are depicted as separate blocks within the communication node 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). The methods and apparatus described herein are not limited in this regard.

Figure 4:
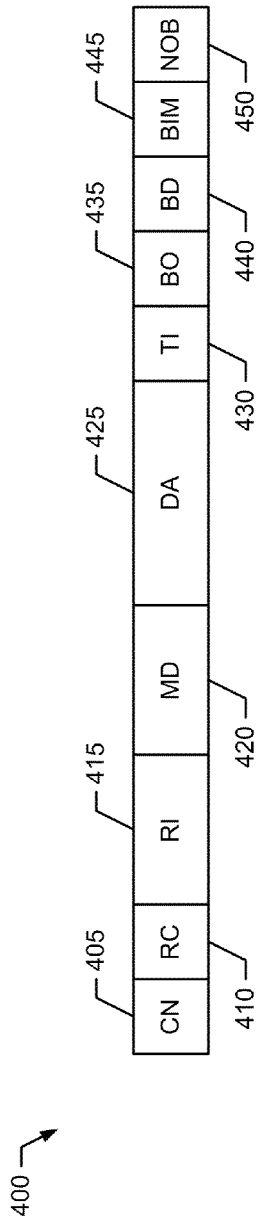
FIG. 4 depicts one example of a measurement request format.

In the example of FIG. 4, a measurement request 400 may include a channel number field (CN) 405, a regulatory class field (RC) 410, a randomization interval field (RI) 415, a measurement duration field (MD) 420, a destination address field (DA) 425, a traffic identifier field (TI) 430, a bin offset field (BO) 435, a bin duration field (BD) 440, a bin increment mode field (BIM) 445, and a number of bins field (NOB) 450.

The channel number field 405 may indicate a particular channel in which measurements of delay is desired by the request node (e.g., one byte of the measurement request 400). The channel regulatory class 410 may indicate a frequency band defining the channel of the channel number field 405 (e.g., one byte of the measurement request 400). The randomization interval field 415 may indicate an upper limit of a random delay used prior to making the measurements (e.g., two bytes of the measurement request 400). The measurement duration field 420 may indicate a duration for the measurements as described in detail below (e.g., two bytes of the measurement request 400). The destination address field 425 may indicate an address of a communication node measuring traffic of a wireless link. For example, the destination address field 425 may a six-byte media access control (MAC) address of the report node. The traffic identifier field 430 may indicate the traffic type or traffic stream selected for measurements (e.g., one byte of the measurement request 400). For example, the traffic type may be voice, video, data, or other suitable type of transmissions.

As described in detail below, the report node may identify a plurality of bins, and each of the plurality of bins may correspond to a delay interval of the measurement duration specified by the measurement duration field 420. The measurement request 400 may also include bin fields specifying a manner in which the report node may generate histogram information indicative of traffic delay (e.g., generally shown as the bin offset field 435, the bin duration field 440, the bin increment mode field 445, and the number of bins field 450).

In particular, the bin offset field 435 may indicate a time position of the first bin (e.g., one byte of the measurement request 400). For example, the time position of the first bin may be 10 milliseconds (ms). The bin duration field 440 may indicate a duration of each of the plurality of bins (e.g., one byte of the measurement request 400). The bin increment mode field 445 may indicate a type of increment of the delay intervals (e.g., one byte of the measurement request 400). For example, a value of zero (0) may correspond to a linear increment in the delay intervals, and a value of one (1) may correspond to an exponential increment in the delay intervals. The number of bins field 450 may indicate a total number of bins in the histogram information (e.g., one byte of the measurement request 400). Thus, the request node may customize histogram information as needed by varying the manner in which the report node may generate the histogram information as described in detail below. Although the above examples described the fields of the measurement request occupying a particular number of bytes, the fields may occupy additional or fewer bytes. The methods and apparatus described herein are not limited in this regard.

Figure 5:
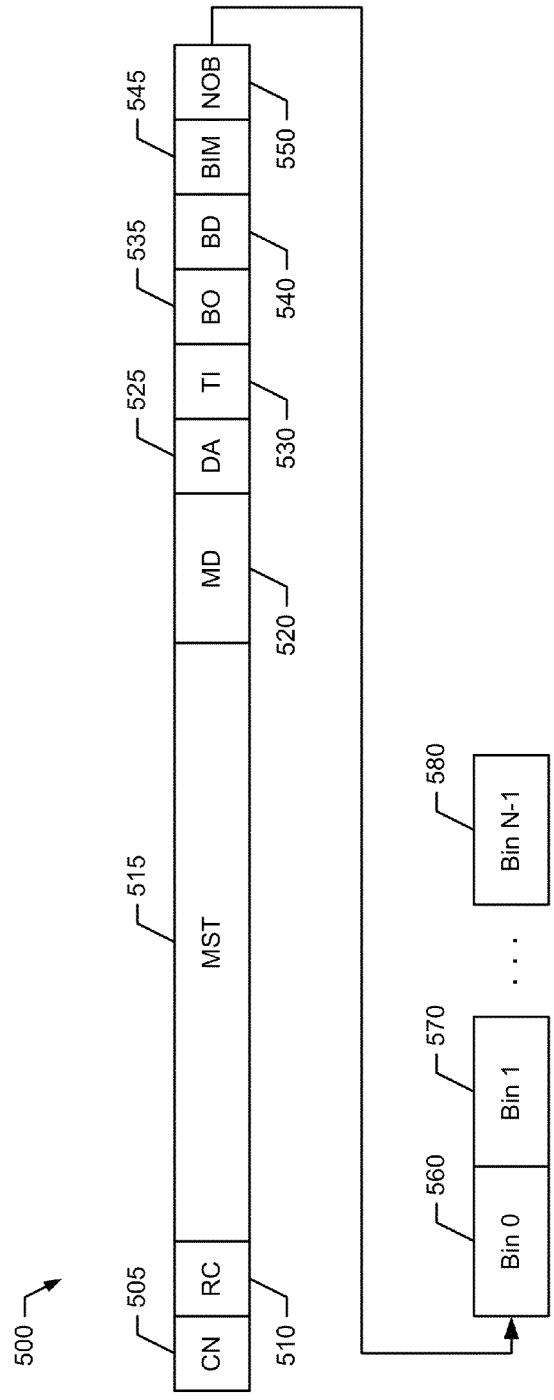
FIG. 5 depicts one example of a measurement report format.

In the example of FIG. 5, a measurement report 500 may include a channel number field (CN) 505, a regulatory class field (RC) 510, a measurement start time field (MST) 515, a measurement duration field (MD) 520, a destination address field (DA) 525, a traffic identifier field (TI) 530, a bin offset field (BO) 535, a bin duration field (BD) 540, a bin increment mode field (BIM) 545, and a number of bins field (NOB) 550.

The channel number field 505 may indicate a particular channel in which measurements of delay is desired by the request node (e.g., one byte of the measurement report 500). The channel regulatory class 510 may indicate a frequency band defining the channel of the channel number field 505 (e.g., one byte of the measurement request 500). The measurement start time field 515 may indicate the initial time of the measurements (e.g., eight bytes of the measurement report 500). The measurement duration field 520 may indicate a duration for the measurements as described in detail below (e.g., two bytes of the measurement report 500). The destination address field 425 may indicate an address of a communication node measuring traffic (e.g., six bytes of the measurement report 500). The traffic identifier field 530 may indicate the traffic type or traffic stream selected for measurements (e.g., one byte of the measurement report 500).

The bin offset field 535 may indicate a time position of the first bin (e.g., one byte of the measurement report 500). The bin duration field 540 may indicate a duration of each of the plurality of bins (e.g., one byte of the measurement report 500). The bin increment mode field 545 may indicate a type of increment of the delay intervals (e.g., one byte of the measurement report 500). The number of bins field 550 may indicate a total number of bins in the histogram information (e.g., one byte of the measurement request 500).

The measurement report 500 may also include histogram information indicative of delay associated with the wireless link between the request and report nodes. As described in detail below, the histogram information may include one or more count fields, generally shown as 560, 570, and 580. Each count field may include a number of transmit time intervals of the measurement duration corresponding to one of a plurality of bins (e.g., four bytes of the measurement report 500). Each of the plurality of bins may correspond to a delay interval of the measurement duration. Although the above examples described the fields of the measurement report occupying a particular number of bytes, the fields may occupy additional or fewer bytes. The methods and apparatus described in herein are not limited in this regard.

Figures 6, 7:
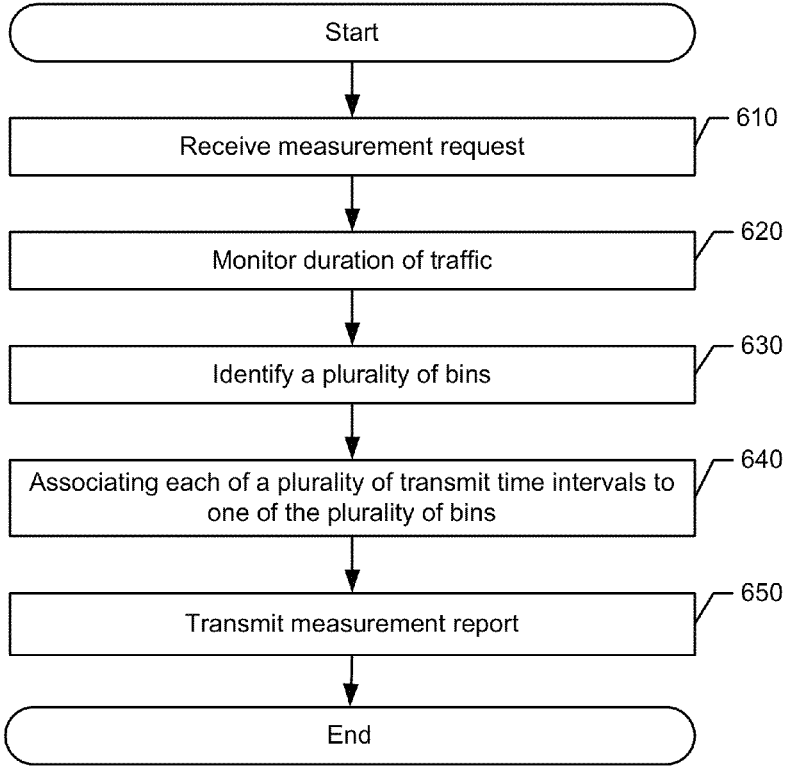
FIG. 6 depicts one example of a table indicative of histogram information.
FIG. 7 is a flow diagram representation of one manner in which an example communication node of FIG. 3 may be configured to provide information indicative of traffic delay of a wireless link.

Turning to FIG. 6, an example table 600 of histogram information may include a plurality of bins, generally shown as Bin 0, Bin 1, Bin 2, Bin 3, Bin 4, Bin 5, Bin 6, and Bin 7. As noted above, the number of bins field 405 of the measurement request from the request node may indicate the number of bins (N) (e.g., N=8). Although FIG. 6 depicts eight bins, the table 600 may include additional or fewer bins.

Each of the plurality of bins may correspond to one of a plurality of delay intervals. The plurality of delay intervals may be based on the bin offset field 435, the bin duration field 440, and the bin increment mode 445. In one example, the bin offset ($i_0$) may be 10 milliseconds (ms), the bin duration ($\Delta i$) may be 10 ms, and the bin increment mode may be a binary exponential mode based on the following equations:

$B_0$: Delay<$i_0$, for $i$=0;

$B_i$: $i_0+(2^{i-1}*\Delta i) \leq$ Delay<$i_0+(2^i*\Delta i)$, for 0<$i$<N−1;

$B_{N-1}$: $i_0+(2^{i-1}*\Delta i) \leq$ Delay, for $i$=N−1.

As a result, Bin 0 may correspond to a delay interval of less than 10 ms. Bin 1 may correspond to a delay interval of greater than or equal to 10 ms but less than 20 ms. Bin 2 may correspond to a delay interval of greater than or equal to 20 ms but less than 40 ms. Bin 3 may correspond to a delay interval of greater than or equal to 40 ms but less than 80 ms. Bin 4 may correspond to a delay interval of greater than or equal to 80 ms but less than 160 ms. Bin 5 may correspond to a delay interval of greater than or equal to 160 ms but less than 320 ms. Bin 6 may correspond to a delay interval of greater than or equal to 320 ms but less than 640 ms. Bin 7 may correspond to a delay interval of greater than or equal to 640 ms.

The histogram information of the table 600 may provide information indicative of delay associated with the wireless link such as a maximum delay, a minimum delay, a mode delay, an average delay, a jitter, and/or other suitable delay information. In one example, the report node may transmit a total of ten frames during the measurement duration as indicated by the count column of the table 600. Based on the acknowledgements from the request node, the report node may measure and associate each transmit time interval of the ten frames with one of the plurality of delay intervals.

In one example, the report node may determine the transmit time interval for each of the ten frames. In particular, the transmit time interval for Frame 1 may be 20 ms. The transmit time interval for Frame 2 may be 10 ms. The transmit time interval for Frame 3 may be 200 ms. The transmit time interval for Frame 4 is 400 ms. The transmit time interval for Frame 5 may be 60 ms. The transmit time interval for Frame 6 may be 15 ms. The transmit time interval for Frame 7 may be 25 ms. The transmit time interval for Frame 8 may be 30 ms. The transmit time interval for Frame 9 may be 35 ms. The transmit time interval for Frame 10 may be 38 ms. Although the above example described the report node transmitting ten frames, the report node may transmit may transmit additional or fewer frames based on the measurement duration.

Based on the above transmit time intervals, none of the ten frames has a delay of less than 10 ms. Thus, Bin 0 has a count of zero. In contrast, Bin 2 has a count of five because five of the ten frames may have a delay of greater than or equal to 20 ms but less than 40 ms (e.g., Frames 1, 7, 8, 9, and 10). In a similar manner, Bin 1 has a count of two because two of the ten frames may have a delay of greater than or equal to 10 ms but less than 20 ms (e.g., Frames 2 and 6). Accordingly, each of Bins 3, 4 and 5 has a count of one (e.g., Frames 3, 4, and 5, respectively), and both of Bins 6 and 7 have a count of zero.

Based on the histogram information of the table 600, the maximum delay may be greater than or equal to 160 ms but less than 320 ms because both Bins 6 and 7 have zero counts and Bin 5 has one or more counts (e.g., Frame 4 with a transmit time interval of 400 ms). The minimum delay may be greater than or equal to 10 ms but less than 20 ms because Bin 0 has zero count and Bin 1 has one or more counts (e.g., Frame 2 with a transmit time interval of 10 ms). The mode delay (e.g., the most frequent delay interval) may be greater than or equal to 20 ms but less than 40 ms because Bin 2 has the greatest number of counts relative to Bins 0, 1, 3, 4, 5, 6, and 7 (e.g., Frames 1, 7, 8, 9, and 10). The methods and apparatus described herein are not limited in this regard.

Alternatively, the bin increment mode may be a linear mode based on the following equations:

$B_0$: Delay<$i_0$, for $i$=0;

$B_i$: $i_0+((i-1)*\Delta i) \leq$ Delay<$i_0+(i*\Delta i)$, for 0<$i$<N−1;

$B_{N-1}$: $i_0+((i-1)*\Delta i) \leq$ Delay, for $i$=N−1.

As a result, Bin 0 may correspond to a delay interval of less than 10 ms. Bin 1 may correspond to a delay interval of greater than or equal to 10 ms but less than 20 ms. Bin 2 may correspond to a delay interval of greater than or equal to 20 ms but less than 30 ms. Bin 3 may correspond to a delay interval of greater than or equal to 30 ms but less than 40 ms. Bin 4 may correspond to a delay interval of greater than or equal to 40 ms but less than 50 ms. Bin 5 may correspond to a delay interval of greater than or equal to 50 ms but less than 60 ms. Bin 6 may correspond to a delay interval of greater than or equal to 60 ms but less than 70 ms. Bin 7 may correspond to a delay interval of greater than or equal to 70 ms.

Although the above examples are described with respect to frames, the methods and apparatus disclosed herein may be applied to other suitable types of transmissions. For example, the methods and apparatus disclosed herein may be applied to packets. The methods and apparatus described herein are not limited in this regard.

In particular, FIG. 7 depicts one manner in which the example communication node 300 of FIG. 3 may be configured to provide information indicative of traffic delay of a wireless link. The example process 700 of FIG. 7 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 7, these actions can be performed in other temporal sequences. Again, the example process 700 is merely provided and described in conjunction with the apparatus of FIG. 3 as an example of one way to configure a communication node to provide information indicative of traffic delay of a wireless link.

In the example of FIG. 7, the process 700 may begin with the communication node 300 operating as a report node and receiving a measurement request (e.g., via the communication interface 310) from another communication node (e.g., a request node) (block 710). As noted above, the measurement request may include information used by the communication node 300 to measure traffic delay of a wireless link between the communication node 300 and the request node.

Based on the measurement request, the communication node 300 (e.g., via the monitor 320) may monitor duration of traffic via the wireless link (block 720). In particular, the measurement request may indicate a measurement duration to measure a particular traffic type such as voice, video, or data transmissions. As a result, the request node may specify the measurement duration based on the type of traffic. In one example, the measurement request may specify longer measurement duration for video transmission than for voice transmission.

The communication node 300 may transmit one or more frames to the request node and monitor for an acknowledgement corresponding to each of the one or more frames from the request node. The communication node 300 may measure an interval from the transmit time of each frame and the receive time of the corresponding acknowledgement (e.g., a transmit time interval). Alternatively, the communication node 300 may operate in a proactive manner and automatically monitor duration of traffic via the wireless link without receipt of the measurement request.

The measurement request may also include information associated with a plurality of bins. Accordingly, the communication node 300 (e.g., the identifier 330) may identify the plurality of bins (block 730). In one example, the measurement request may specify the bin offset, the bin duration, the bin increment mode, and the number of bins of the plurality of bins based on the type of traffic. For example, the measurement request may specify a large number of bins for video transmission than for voice transmission. As noted above, each of the plurality of bins may correspond to a delay interval based on the bin increment mode (e.g., a linear mode or an exponential mode). In one example, the communication node 300 may identify eight bins with each bin corresponding to a delay interval as in the table 600 of FIG. 6. Thus, the request node may customize histogram information as needed by varying the manner in which the report node may generate the histogram information.

The communication node 300 may also associate each transmit time interval with one of the plurality of bins (block 740). In one example, the communication node 300 may transmit ten frames resulting in ten transmit time intervals. Accordingly, the communication node 300 may associate each of the ten transmit time intervals with one of the plurality of bins so that each bin may operate as a counter for a corresponding delay interval. As a result, the communication node 300 may generate histogram information indicative of traffic delay of the wireless link between the communication node 300 and the request node.

Based the histogram information, the communication node 300 may transmit a measurement report to the request node (block 750). The measurement report may include a count of frames for each delay intervals. In one example, the table 600 of FIG. 6 may indicate that Bin 2 may have the greatest count of frames with five. Accordingly, the most frequency delay may be a delay greater than or equal to 20 ms but less than 40 ms As a result, the communication node 300 may provide a probability distribution of delay of traffic via the wireless link between the communication node 300 and the request node. The methods and apparatus described herein are not limited in this regard.

Figure 8:
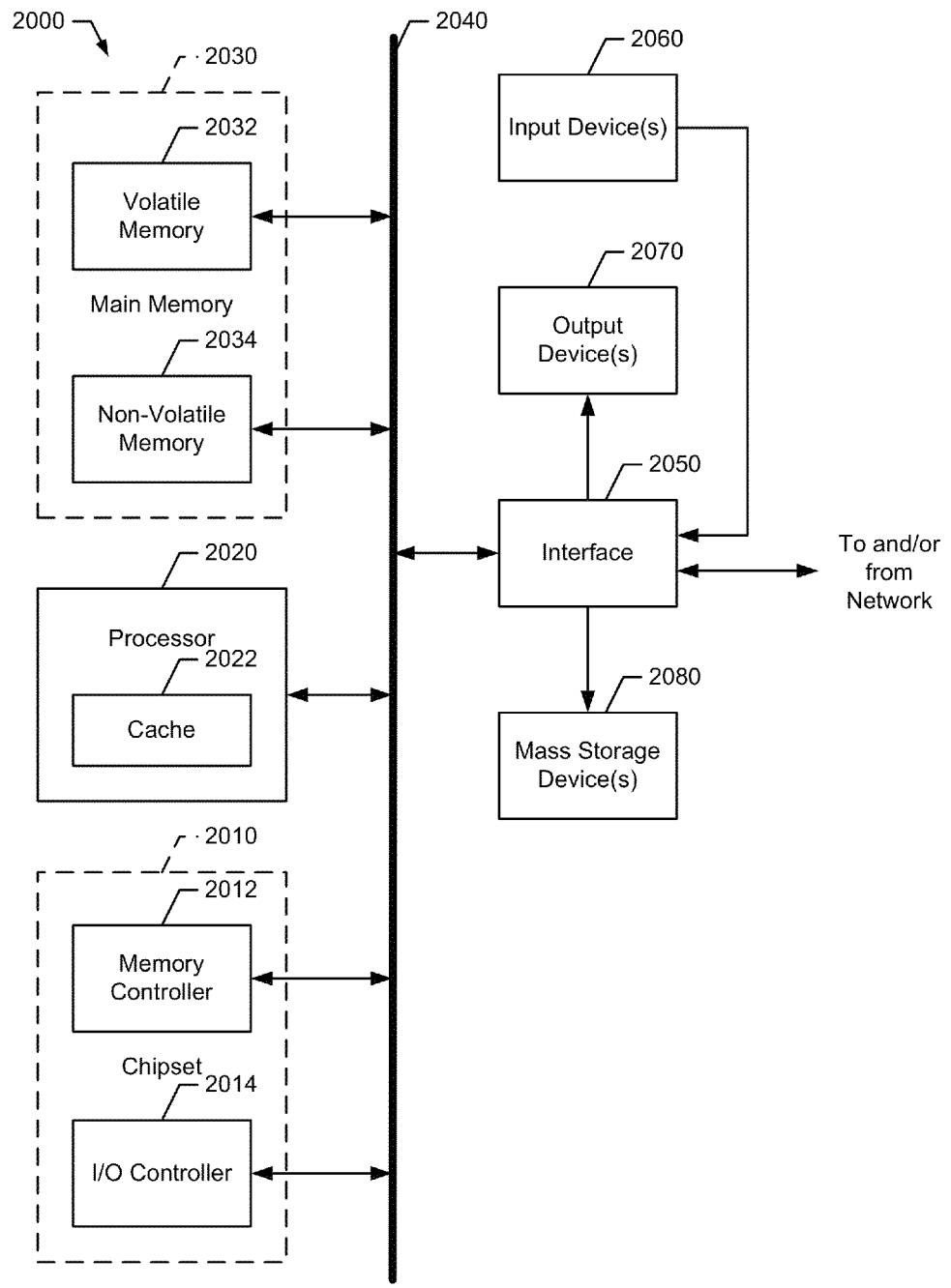
FIG. 8 is a block diagram representation of an example processor system that may be used to implement the example communication node of FIG. 3.

FIG. 8 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 8 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 8 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   determining traffic delays of communications traffic over a wireless link, wherein each of the traffic delays includes at least a time interval between a transmit time of a data unit and a receipt time of an acknowledgement corresponding to the data unit;
   based on the determining, generating histogram information, the histogram information including a respective count corresponding to each of a plurality of traffic delay intervals; and
   wirelessly transmitting a measurement report message to a remote station (STA), the measurement report message including the histogram information.

2. The method of claim 1, further comprising wirelessly receiving a measurement request message from the remote STA, wherein the measurement request message indicates a plurality of bins corresponding to the plurality of traffic delay intervals.

3. The method of claim 2, wherein the plurality of traffic delay intervals corresponding to the plurality of bins have exponentially distributed bin offsets.

4. The method of claim 2, wherein the measurement request message further comprises information indicative of one or more of a measurement duration, a bin offset, or a bin duration.

5. The method of claim 2, wherein the communications traffic is of a particular traffic type, and wherein the measurement request message indicates the particular traffic type.

6. The method of claim 1, wherein the measurement report message further including at least one of: (i) a channel number field; (ii) a regulatory class field; (iii) a measurement start time field; (iv) a destination address field; (v) a traffic identifier field; (vi) a bin offset field; (vii) a bin duration field; (viii) a bin increment mode filed; or (ix) a number of bins field.

7. An apparatus comprising:
   a monitor that determines traffic delays of communications traffic over a wireless link, wherein each of the traffic delays includes at least a time interval between a transmit time of a data unit and a receipt time of an acknowledgement corresponding to the data unit; and
   a generator that, based on said determining, generates histogram information, the histogram information including a count corresponding to each of a plurality of traffic delay intervals.

8. The apparatus of claim 7, further comprising a receiver that wirelessly receives a measurement request message from a remote station (STA), said measurement request message indicating a plurality of bins corresponding to a plurality of traffic delay intervals.

9. The apparatus of claim 8, wherein the measurement request message further comprises information indicative of one or more of a measurement duration, a bin offset, or a bin duration.

10. The apparatus of claim 7, further comprising a transmitter to wirelessly send the histogram information to the remote STA.

11. The apparatus of claim 10, wherein the transmitter is further configured to transmit at least one of: (i) a channel number field; (ii) a regulatory class field; (iii) a measurement start time field; (iv) a destination address field; (v) a traffic identifier field; (vi) a bin offset field; (vii) a bin duration field; (viii) a bin increment mode filed; or (ix) a number of bins field.

12. The apparatus of claim 7, wherein communications traffic is of a particular traffic type, and wherein the measurement request message indicates the particular traffic type.

13. An article comprising a non-transitory machine-accessible medium having stored thereon instructions that, when executed by a machine, cause the machine to:
   wirelessly transmit a measurement report request to a remote wireless device, the measurement report request indicating a plurality of bins corresponding to respective traffic delay intervals;
   receive, responsive to the measurement report request, a measurement report message including histogram information, wherein the histogram information includes a respective count corresponding to each of the plurality of bins corresponding to respective traffic delay intervals, and wherein each of the traffic delay intervals corresponds to at least a time interval between a transmit time of a data unit and a receipt time of an acknowledgement corresponding to the data unit at the remote wireless device.

14. The article comprising the non-transitory machine-accessible medium of claim 13, wherein the respective traffic delay intervals corresponding to the plurality of bins have exponentially distributed bin offsets.

15. The article comprising the non-transitory machine-accessible medium of claim 13, wherein the measurement request message further comprises information indicative of one or more of a measurement duration, a bin offset, or a bin duration.

16. The article comprising the non-transitory machine-accessible medium of claim 13, wherein the measurement report message further includes at least one of: (i) a channel number field; (ii) a regulatory class field; (iii) a measurement start time field; (iv) a destination address field; (v) a traffic identifier field; (vi) a bin offset field; (vii) a bin duration field; (viii) a bin increment mode filed; or (ix) a number of bins field.

17. A wireless station, comprising:
   a transmitter to wirelessly transmit a measurement report request to a remote wireless device, the measurement report request indicating a plurality of bins corresponding to respective traffic delay intervals;
   a receiver to receive, responsive to the measurement report request, a measurement report message including histogram information, wherein the histogram information includes a respective count corresponding to each of the plurality of bins corresponding to respective traffic delay intervals, and wherein each of the traffic delay intervals corresponds to at least a time interval between a transmit time of a data unit and a receipt time of an acknowledgement corresponding to the data unit.

18. The wireless station of claim 17, wherein the measurement request message indicates a traffic type as one of (i) voice traffic or (ii) video traffic.

19. The wireless station of claim 17, wherein the respective traffic delay intervals corresponding to the plurality of bins have exponentially distributed bin offsets.

20. The wireless station of claim 17, wherein the measurement request message further comprises information indicative of one or more of a measurement duration, a bin offset, or a bin duration.

* * * * *